United States Patent Office 3,716,533
Patented Feb. 13, 1973

3,716,533
N-DEFORMYLATION OF 3-HALOMETHYL-7β-FORMAMIDOCEPHALOSPORIN-1-OXIDES
David Cedric Humber, Greenford, England, assignor to Glaxo Laboratories Limited, Greenford, England
No Drawing. Filed Aug. 21, 1970, Ser. No. 66,125
Claims priority, application Great Britain, July 10, 1970, 33,697/70
Int. Cl. C07d 99/24
U.S. Cl. 260—243 C          8 Claims

ABSTRACT OF THE DISCLOSURE

A process for the preparation of 7β-aminocephem-4-carboxylic acids and derivatives thereof comprises N-deformylating a 7β-formamidocephem-4-carboxylic acid or derivative thereof with a Lewis acid in a lower alkane diol under substantially anhydrous conditions.

---

This invention is concerned with improvements in or relating to the production of analogues of cephalosporin C.

The cephalosporin compounds referred to in this specification are generally named with reference to the cepham ring structure. The cepham ring is represented as follows:

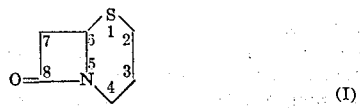

(see J.A.C.S. 1962, 84, 3400 and J. Chem. Soc. 1965, 5031). The term "cephem" refers to the basic cepham ring structure with a single double bond.

In the production of cephalosporin antibiotics and intermediates therefor it is frequently necessary to subject intermediates containing at 7β-amino group to a sequence of reactions to obtain the desired new compounds. It may be undesirable to acylate the 7β-amino group with the intended acylating agent at an early stage of the synthesis. This may be because reactions which are effected elsewhere in the molecule, e.g. nucleophilic displacement reactions at the 3-position, will produce unwanted reactions at the newly introduced acyl group at the 7β-position. Furthermore if the 7β-amino group is left unprotected this may also be subject to unwanted reactions. In Dutch patent application No. 6916634 we have disclosed that the 7β-amino group may be simply protected in an economic fashion by formylation while reactions are being effected elsewhere in the molecule and the 7β-formamido group may thereafter be readily cleaved to regenerate the 7β-amino group.

We have also disclosed in Dutch application No. 6916634 that N-deformylation of the 7β-formamido group may be effected by acid catalysed hydrolysis or alcoholysis with a mineral acid at a temperature —15° to +100° C., a convenient reagent being concentrated hydrochloric acid in methanol, dioxan or tetrahydrofuran. All of the reagents disclosed in Dutch application No. 6916634 contain water. We have now found that the N-deformylation may be more efficiently achieved if substantially anhydrous reagents are employed.

According to the invention, therefore, there is provided a process for the preparation of a 7β-aminocephem-4-carboxylic acid or a derivative thereof, e.g. an ester or oxide, which comprises N-deformylating a 7β-formamido-cephem-4-carboxylic acid or derivative thereof with the aid of a Lewis acid in a lower alkanol or a lower alkane diol, under substantially anhydrous conditions.

The 7β-formamido compounds used in the process according to the invention may have the general formula:

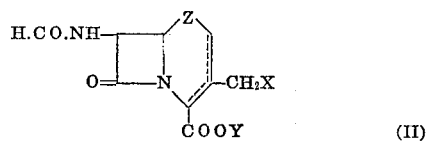

(II)

where X is H, OH, OAc (Ac=acetyl), or the residue of a nucleophile, (e.g. —SCH₃, OCH₃, Br or pyridinium), Y is H or a carboxyl blocking group, e.g. an alcohol or phenol residue, and Z is >S or >S→O, the dotted line bridging the 2-, 3- and 4-position indicating that the compound may be a ceph-2-em or ceph-3-em compound.

Esterification of the 4-carboxyl group may be effected to provide ester residues of any desired alcohol or phenol e.g. of benzyl alcohols such as p-methoxybenzyl alcohol, di-p-methoxyphenylmethanol, triphenylmethanol, diphenylmethanol, benzoyloxymethanol or p-nitrobenzyl alcohol; furfuryl alcohol; t-butanol or 2,2,2-trichloroethanol.

Lewis acids which may be used in the process according to the invention include phosphorus oxychloride, thionyl chloride, phosphorus trichloride, phosphorus tribromide, silicon tetrachloride, trichlorosilane, anhydrous HCl, anhydrous HBr, phosgene, acetyl chloride, acetyl bromide, p-toluene sulphonyl chloride, dimethylsilyldichloride and trimethylsilylchloride. With some of these reagents there may arise the risk of acylation, phosphorylation, reduction or halogen exchange. Sometimes these risks will be undesirable and other Lewis acids which will avoid such concomitant reactions should be chosen. On other occasions it may be desirable to effect concomitant reactions e.g. reduction of 1-oxide with PCl₃. The preferred Lewis acids include phosphorus oxychloride, thionyl chloride, anhydrous HCl and anhydrous HBr. The Lewis acids will ordinarily be used in amounts of at least one equivalent based on the cephalosporin compound.

The term "lower alkanol" is used herein to designate an alkanol containing 1–6, preferably 1–4 carbon atoms e.g. methanol, ethanol, isopropanol etc. The term "lower alkane diol" is used herein to indicate alkane diols having 2–6, preferably 2–4, carbon atoms e.g. ethylene glycol, propane-1,2-diol, propane-1,3-diol etc. These substances should have low water content, preferably less than 0.5% by weight, to facilitate obtaining the desired substantially anhydrous reactions conditions.

Ordinarily we prefer to employ the alcohol as the solvent for the reaction but a diluent may be used if desired. The diluent may be an inert, organic solvent such as a cyclic or acyclic ether, e.g. tetrahydrofuran (THF) or diethyl ether, or a chlorinated hydrocarbon e.g. methylene chloride.

The N-deformylation may be effected at a temperature in the range of —40° to +100° C. Advantageously the reaction is performed in the temperature range of —20° to +70° C., preferably —10° to +10° C.

The course of the N-deformylation may be followed by thin layer chromatography or electrophoresis.

The 7β-amino compound may separate as an insoluble salt e.g. a hydrochloride, hydrobromide or hydrogen p-toluene sulphonate, obtained for example by the addition of toluene sulphonic acid or a salt thereof or it may be precipitated by adjustment of the pH (e.g. to an isoelectric point), if necessary with extraction with a suitable solvent.

The process according to the invention is advantageously used to effect N-deformylation of compounds prepared according to application No. 66,128 filed on Aug. 21, 1970, i.e. compounds of the general formula

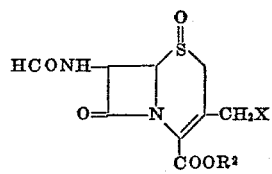

III where X is halogen, particularly bromine, and R² has the same meaning as Y.

The process according to the invention also finds particular application within the context of the process of Dutch application No. 6916634. According to an embodiment of the invention therefore we provide a process for the preparation of a 7β-aminocephem-4-carboxylic acid or a derivative thereof which includes the steps of formylating a 7β-aminocephem-4-carboxylic acid or a derivative thereof having a group other than the desired group at the 1-, 2-, 3- or 4-position, effecting one or more reactions involving the 1-, 2-, 3- or 4-position, and N-deformylating the resulting compound with the aid of a Lewis acid in a lower alkanol or a lower alkane diol, under substantially anhydrous conditions to yield the desired 7β-aminocephem-4-carboxylic acid or derivative thereof.

Formylation may be carried out by using any convenient formylating agent such as, for example, formic acid together with a lower alkanoic acid anhydride, e.g. acetic anhydride, e.g. at a temperature of up to 70° C. preferably from 15 to 40° C. Alternatively formylation may be carried out with a formic acid ester, e.g. in refluxing ethyl formate with, if desired, a bifunctional catalyst such as pyrid-2-one or imidazole. Further alternative formylating agents are orthoformates e.g. lower alkyl orthoformates such as methyl or ethyl orthoformate. Other formylating agents include formyl halides e.g. formyl fluoride or formyl chloride; or formic acid, e.g. at 100° C.

The step of introducing the desired group at the 1-, 2-, 3- or 4-position may be effected as described in Dutch application No. 6916634.

In order that the invention may be well understood the following examples are given by way of illustration only:

Proton magnetic resonance spectra were recorded at 100 mHz.; the signs of coupling constants (J) are not assigned.

Thin-layer chromatography (TLC) was conducted on 0.25 mm. Kieselgel $F_{254}$ layers supplied by E. Merck AG, Darmstadt.

Paper electrophoresis was performed on Whatman No. 3MM paper at 30 v./cm. in pH 1.9 buffer consisting of formic acid (16.7 ml., 98%), acetic acid (84 ml.), acetone (105 ml.) and water (495 ml.). Spots were located by visual examination with a Hanovia "Chromatolite" ultra violet lamp or by spraying with the indicated spray reagent. $R_c$ values represent movement with respect to cephaloridine, $R_c$ 1.00, as standard; vitamin $B_{12}$ served as an uncharged marker.

In Examples 2, 3 and 8 the end products and subsequent starting materials are designated as 3-bromomethyl compounds and salts with bromide anions. Owing to the incidence of chloride anion in the reactions, products are obtained which are mixed bromide/chloride materials. Equivalent weights and physical properties are calculated on the basis of the name given. The exchange of halogen may be estimated by chemical analysis or by U.V. absorption. Exchange of chlorine for bromine at the 3-methylene position is accompanied by a shift in $\lambda_{max}$. (ethanol). Consequently, the following approximate corrections should be made to the products of the examples:

| Examples | Br:Cl |
|---|---|
| 2 | 2:1 |
| 3(a) | 9:1 |
| (b) | 9:1 |
| (c) | 1:2 |
| (d) | 2:1 |
| (e) | 1:1 |
| (f) | 7:1 |
| (g) | 3:2 |
| (h) | 1:1 |
| 8 | 2:1 |

These figures were based on $\lambda_{max}$. 283 to 283.5 nm. for the product from Example 10.

EXAMPLE 1

2,2,2-trichloroethyl 7β-amino-3-methylceph-3-em-4-carboxylate, 1β-oxide, hydrochloride 2,2,2-trichloroethyl 7β-formamido-3-methylceph-3-em-4-carboxylate, 1β-oxide [924 mg., 2.37 mmole, prepared as described in Preparation A3 of copending application No. 66,128] was suspended in dry methanol (10 ml.) and phosphorus oxychloride (0.46 ml., 5.0 mmole) was added. The starting material went into solution and after ca. 1 min. a fine white solid was precipitated. After 20 min. stirring, the suspension was diluted with ether (20 ml.), refrigerated and the product collected. The white crystalline solid was washed with ether (50 ml.) and dried to give the hydrochloride (747 mg., 79.2%), M.P. 181°, $[\alpha]_D^{24}+111°$ (c. 0.98; $Me_2SO$), $\lambda_{max}$. (MeOH) 268.5 nm. ($\epsilon$ 7,490), $\nu_{max}$.

(Nujol) 2510 $(-\overset{+}{N}H_3)$, 1786 (azetidin-2-one), 1743 and 1724 ($-CO_2CH_2CCl_3$) and 1000, 1020 and 1045 cm.$^{-1}$ (S→O), $\tau$ ($Me_2SO$-$d_6$) 4.73 (1-proton doublet, J 5 Hz.; $C_7$—H), 4.90 (1-proton doublet, J 5 Hz.; $C_6$—H), 4.81 and 4.98 (2-proton AB-quartet, J 12 Hz; $-CH_2CCl_3$), 6.02 (2-proton singlet; $CH_2SO$), ca. 2.0 to 7.0 (broad hump;

$-\overset{+}{N}H_3$) and 7.85 (3—proton singlet;

$-CH_3$) (Found: C, 30.3; H, 2.9; Cl, 35.1; N, 7.0; S, 8.2 $C_{10}H_{12}Cl_4N_2O_4S$ (398.2) requires: C, 30.2; H, 3.0; Cl, 35.6; N, 7.0; S, 8.05%). TLC ($CH_2Cl_2$—$Me_2CO$ (1:1) showed one spot $R_F$ 0.29.

EXAMPLE 2

2,2,2-trichloroethyl 7β-amino-3-bromomethylceph-3-em-4-carboxylate, 1β-oxide, hydrochloride 2,2,2-trichloroethyl 3-bromomethyl-7β-formamidoceph-3-em-4-carboxylate, 1β-oxide [2.34 g., 5.0 mmole, prepared as described in Example B3 of copending application No. 66,128] was suspended in dry methanol (20 ml.) and the stirred mixture was treated with phosphorus oxychloride (1 ml., 10.9 mmole) dropwise over ca. 4 min. During the course of the addition the internal temperature rose to and remained at 50°±5°. By the end of the addition the starting material had all gone into solution and after ca. 1 min. a fluffy white solid began to crystallise and within 5 min. the mixture had set solid. After dilution with ether (25 ml.) and after brief refrigeration, the product was collected, washed well with ether and dried to give the hydrochloride (1.99 g., 83.5%), M.P. >200°. $[\alpha]_D^{22}+7.5°$ (c. 1.0; $Me_2SO$), $\lambda_{max}$. (MeOH) 280 nm. ($\epsilon$ 8,590), $\gamma_{max}$. (Nujol) 2700 $(-\overset{+}{N}H_3)$ 1792 (azetidin-2-one), 1751 and 1741 ($-CO_2CH_2CCl_3$) and 1005, 1030 and 1045 cm.$^{-1}$ (S→O), $\tau$ ($Me_2SO$-$d_6$) ca. 3.0 to 6.0 (broad hump;

$-\overset{+}{N}H_3$ add $H_2O$)

4.58 (1-proton doublet, J 5 Hz.; $C_7$-H), 4.79 (1-proton doublet, J 5 Hz.; $C_6$—H), 4.76 and 4.93 (2-proton AB-quartet, J 13 Hz.; —CH$_2$CCl$_3$), 5.34 (2-proton singlet; —CH$_2$Br) 5.93 (2-proton broad singlet; —CH$_2$SO) (Found: C, 25.0; H, 2.6; N, 5.0; S, 6.9; total halogen content, 4.85 equiv./mole compound. C$_{10}$H$_{11}$BrCl$_4$N$_2$O$_4$S (477.0) requires: C, 25.2; H, 2.3; N, 5.9; S, 6.7%; total halogen content, 5.0 equiv./mole compound). TLC (CH$_2$Cl$_2$—Me$_2$CO (1:1) showed one spot, R$_F$ 0.37, which gave a brown colour on spraying with potassium iodoplatinate spray reagent.

EXAMPLE 3

N-deformylation of 2,2,2 - trichloroethyl 3-bromomethyl-7β-formamidoceph-3-em-4-carboxylate, 1β-oxide under various conditions The following table lists various representative conditions employed in the N-deformylation of the title compound (but excludes those already described in the preceding examples). The authenticity of the product (2,2,2-trichloroethyl 7β - amino-3-bromomethylceph-3-em-4-carboxylate, 1β-oxide, hydrochloride) was checked by TLC comparison with the hydrochloride described in Example 2.

The reactions were conducted in the following general fashion.

The reagent was added to a suspension of the starting material in the particular solvent and the mixture stirred until the reaction was judged complete by the criterion of TLC or by the commencement of precipitation of the product. The mixture was then stirred for an additional 30 min., diluted with an equal volume of ether, then refrigerated for 30–60 min. The product was collected using additional ether and dried in vacuo.

+23.6° (c. 1.04; Me$_2$SO), λ$_{max}$. (MeOH) 274 nm. (8,310)

ν$_{max}$. (Nujol) 2500 $(-\overset{+}{N}H_3)$ 1785 (azetidin-2-one), 1728 (—CO$_2$CH$_2$CCl$_3$) and 1050 cm.$^{-1}$ (S→O), τ (Me$_2$SO-d$_6$) 4.69 (1-proton doublet, J 5 Hz.; C$_7$—H), 4.85 (1-proton doublet, J 5 Hz.; C$_6$—H), 4.78 and 4.98 (2-proton AB-quartet, J 12 Hz.; —CH$_2$CCl$_3$), 5.78 and 6.02 (2-proton AB-quartet, J 18 Hz. —CH$_2$SO) 6.24 and 6.45 (2-proton AB-quartet, J 14 Hz.; —CH$_2$SCH$_3$) and 8.01 (3-proton singlet, —SCH$_3$) (Found: C, 29.9; H, 3.2; Cl, 31.6; N, 6.3; S, 14.1; C$_{11}$H$_{14}$Cl$_4$N$_2$O$_4$S$_2$ (444.2) requires C, 29.7; H, 3.2; Cl, 31.9; N, 6.3; S, 14.4%). Electrophoresis showed a single spot, R$_c$ 2.8, which migrated towards the cathode and showed up yellow (on a pink background) after spraying with potassium iodoplatinate.

EXAMPLE 5

2,2,2-trichloroethyl 7β-amino-3-methylthiomethylceph-3-em-4-carboxylate, hydrochloride Phosphorus oxychloride (0.5 ml., 5.47 mmole) was added dropwise over 3 min. to a stirred suspension of 2,2,2 - trichloroethyl 7β-formamido-3-methylthiomethyl-ceph-3-em-4-carboxylate [1.05 g., 2.5 mmole, prepared as described in Example D17(ii) of copending application No. 66,128] in dry methanol (10 ml.). During the addition the starting material went into solution and the temperature of the mixture reached a maximum of ca. 45°. After 1 min. a white solid came out of the solution and the mixture rapidly set solid. The mixture was diluted with ether (10 ml.), stirred briefly and the product col-

| Example number | Scale (mmole) | Reagent (mmole) | Solvent (ml.) | Temperature range [1] | Time [2] | Yield [3] | λ$_{max}$. (E$_{cm.}^{1\%}$)[4] | [α]$_D$, degrees [5] |
|---|---|---|---|---|---|---|---|---|
| 3(a) | 2.5 | SOCl$_2$ (10.0) | MeOH (20) | 0–10° (A) | 85 minutes | 84.7 | 282.5 (193) | +3.9 |
| 3(b) | 2.5 | PCl$_3$ (10.1) | MeOH (20) | 20–40° (B) | 10 minutes | 65.7 | 282.5 (192) | +9.6 |
| 3(c) | 2.5 | HSiCl$_3$ (10.0) | MeOH (10) | 0–10° (A) | 15 minutes | 70.2 | 277 (138) | +8.4 |
| 3(d) | 2.5 | POCl$_3$ (9.6) | n-BuOH (20) | 25–40° (B) | 2½ hours | 77.4 | 280.5 (178) | +11.8 |
| 3(e) | 15.0 | POCl$_3$ (32.8) | MeOH (30) | 0–10° (A) | 45 minutes | 82.5 | 279 (159) | +6.3 |
| 3(f) | 2.5 | HCl gas (30.0) | MeOH (20) | 0–5° (A) | 75 minutes | 77.5 | 282 (181) | +5.8 |
| 3(g) | 2.5 | HCl gas (10.0) | MeOH (20) | 20–50° (C) | ca. 5 minutes | 67.7 | 280 (178) | +7.0 |
| 3(h) | 2.5 | HCl gas (30.0) | THF (19), MeOH (1) | 0–5° (A) | 3 hours | 73.4 | 279 (169) | +7.7 |

[1] Temperature ranges were as follows: (A) reactions conducted with external ice/water-bath cooling throughout, with the rate of addition of reagent such that the internal temperature did not rise above 10°; (B) temperature obtained by adding reagent at the indicated rate in the absence of any cooling—the temperature of the mixture returns to room temperature after the addition is complete; (C) External water bath used to obtain an internal temperature of 45 to 50° and withdrawn as soon as complete solution is obtained.

[2] Refers to the time interval between the start of addition of reagent and the commencement of the precipitation of the hydrochloride.

[3] All yields quoted are corrected for purity assuming an (E$_{cm.}^{1\%}$) 193 for the pure hydrochloride (see entry 1 in the table).

[4] Ultraviolet spectra were measured for methanol solutions.

[5] Optical rotations were measured for solutions of 1.01±0.03% in dimethylsulphoxide at 20–25°.

Note.—3(a) = SOCl$_2$ added over 10 minutes. Starting material all in solution after 70 minutes; 3(b) = PCl$_3$ added over 3 minutes. Starting material all in solution after 5 minutes; 3(c) = HSiCl$_3$ added over 4 minutes. Starting material all in solution after ca. 14 minutes. Product precipitated in gelatinous state; 3(d) = POCl$_3$ added over 2 minutes. Reaction mixture heterogeneous throughout, but shown to be complete after ca. 2½ hours by TLC; 3(e) = POCl$_3$ added over 35 minutes. Starting material went completely into solution after product started precipitating; 3(f) = Starting material went into solution as product was precipitated; 3(g) = Starting material went into solution on warming and almost immediately product was precipitated; 3(h) = Starting material went into solution immediately. Product precipitated using excess ether.

EXAMPLE 4

2,2,2-trichloroethyl 7β-amino-3-methylthiomethylceph-3-em-4-carboxylate, 1β-oxide, hydrochloride A suspension of 2,2,2-trichloroethyl 7β-formamido-3-methylthiomethylceph-3-em-4-carboxylate, 1β-oxide [1.10 g., 2.5 mmole, prepared as described in Example D17(i) of copending application No. 66,128] in dry methanol (10 ml.), stirred at 0–5°, was treated with phosphorus oxychloride (1 ml., 10.9 mmole) dropwise over ca. 2 min. The starting material dissolved and immediately a white solid came out of solution. After stirring at 0–5° for 1 hr., the suspension was diluted with ether (10 ml.), refrigerated for 2 hr. and the product collected using ether to provide the title hydrochloride as white crystals (1.01 g., 91%), M.P. 170–172° (with decomposition), [α]$_D^{22}$ lected, washed with ether (ca. 25 ml.) and dried to furnish the title hydrochloride as a feathery white solid (941 mg., 88%), M.P. 169–172° (with decomposition), [α]$_D^{20}$ +5.25° (c. 0.99; Me$_2$SO), λ$_{max}$. (MeOH) 272.5 nm. (ε 6,640), ν$_{max}$. (Nujol) ca. 2600 (—$\overset{+}{N}H_3$)

1775 (azetidin-2-one) and 1720 cm.$^{-1}$ (—CO$_2$CH$_2$CCl$_3$), τ (Me$_2$SO-d$_6$) 4.69 (1-proton doublet, J 5 Hz.; C$_7$—H), 4.88 and 5.01 (2 - proton AB-quartet, J 12 Hz.; —CH$_2$CCl$_3$), 4.90 (1-proton doublet, J 5 Hz.; C$_6$-H), 6.14 and 6.39 (2-proton AB-quartet, J 17 Hz.; C$_2$—CH$_2$), 6.23 (2-proton singlet; —CH$_2$SCH$_3$) and 7.97 (3-proton singlet; —SCH$_3$). (Found: C, 31.2; H, 3.3; Cl 33.0; N, 6.6; S, 15.0, C$_{11}$H$_{14}$Cl$_4$N$_2$O$_3$S$_2$ (428.2) requires C, 30.85; H, 3.3; Cl, 33.1; N, 6.55; S, 15.0%). Electrophoresis showed a single spot, $R_C$ 2.8, which migrated towards the cathode and which gave a yellow colour (on a pink background) upon spraying with potassium iodoplatinate reagent.

EXAMPLE 6

7β-amino-3-methylceph-3-em-4-carboxylic acid, 1β-oxide, hydrochloride (a) 7β - Amino-3-methylceph-3-em-4-carboxylic acid (21.4 g., 0.1 mole) was added with stirring to a mixture of formic acid (98–100%; 50 ml.) and acetic anhydride (13 ml.). The black reaction mixture was stirred at 20° for 1 hour and then cooled to ca. 5° when peracetic acid (43.7% w./v.; 17.4 ml., 0.1 mole) was added over a period of 15 minutes. A light brown solid had precipitated by the end of the addition. The reaction mixture was diluted with water (50 ml.) and stirred for a further 10 minutes, and the solid was filtered off, washed with water (30 ml.), dried (10.63 g.) and crystallised from boiling water (120 ml.) to give 7β - formamido-3-methylceph-3-em-4-carboxylic acid, 1β-oxide (6.18 g., 24%), M.P. 165–168° resolidifying and then melting at 185–193°, $[\alpha]_D^{25}$ +293° (c. 1.13; $H_2O$), $[\alpha]_D^{25}$ +211° (c. 1.09; $Me_2SO$), $\lambda_{max}$. (pH 6 phosphate) 255 nm. ($E_{1\,cm}^{1\%}$ 329, ε 8,500), $\nu_{max}$ (Nujol) 3300 (NH), 3620 and ca. 2600 (OH, monomeric and dimeric), 1770 (azetidin-2-one), ca. 1760 and 1720 ($CO_2H$, monomeric and dimeric), 1660 and 1535 (CONH) and 990 cm.$^{-1}$ (S→O), τ ($D_2O$ NaHCO$_3$) 1.80 (1-proton singlet; CHO), 4.12 (1-proton doublet, J 5 Hz.; $C_7$—H), 5.14 (1-proton doublet, J 5 Hz., $C_6$—H), 6.36 (2-proton singlet; $C_2$—$H_2$), 8.04 (3-proton singlet; $C_3$—$CH_3$). (Found: C, 37.5, 37.85; H, 4.0; N, 9.9, 9.6; S, 12.2 $C_9H_{10}N_2O_5S$ (258.3) requires C, 41.85; H, 3.9; N, 10.85; S, 12.4%). The compound was probably a hydrate.

(b) Phosphorus oxychloride (0.92 ml.; 10 mmole) was added to a stirred suspension of 7β-formamido-3-methylceph - 3 - em-4-carboxylic acid, 1β-oxide (0.645 g.; 2.5 mmole) in dry methanol (20 ml.) at 0–5° (ice/water bath) at such a rate that the internal temperature did not exceed 10°. After the addition, which took 15 min., the mixture was stirred at 0 to 5° and the starting material went into solution over a period of 2 to 3 hr. After 4 hr. the solution was diluted with ether (20 ml.) and the resulting white precipitate was collected, washed well with ether and dried to give the amino acid hydrochloride (0.64 g.; 95.7%), M.P.>210°, $[\alpha]_D^{22}$ +147° (c. 0.98; $Me_2SO$), $\lambda_{max}$. (MeOH) 262 nm. (ε 7,310), $\nu_{max}$.

(Nujol) ca. 2600 ($-\overset{+}{N}H_3$), 3700 to 2250 (—CO.OH and $H_2O$), 1782 (azetidin-2-one), 1710 (—CO.OH) and 1010 cm.$^{-1}$ (S→O), τ ($Me_2SO$-$d_6$( ca. 2.0 to 5.0 (broad hump;

$H_3\overset{+}{N}$ and $CO_2H$ and $H_2O$), 4.80 and 4.98 (two 1-proton doublets, J 4.5 Hz.; $C_6$—H and $C_7$—H), 6.13 (2-proton singlet; —$CH_2SO$ and 7.91 (3-proton singlet; =C—$CH_3$).

EXAMPLE 7

2,2,2 - trichloroethyl N-[7β-aminoceph-3-em-3-ylmethyl]-pyridinium bromide/chloride 4-carboxylate, 1β-oxide hydrochloride A solution of 2,2,2 - trichloroethyl N-[7β-formamidoceph-3-em-3-ylmethyl] pyridinium bromide 4-carboxylate, 1β-oxide [547 mg., 1 mmole, prepared as described in Example D9(i) of copending application No. 66,128] in dry methanol was cooled to 0–5° with magnetic stirring. Phosphorus oxychloride (0.35 ml., 3.82 mmole) was added and the solution stirred at 0–5° for 30 min., then refrigerated overnight at −16°. Dilution with ether (ca. 40 ml.) precipitated a buff solid which was extremely hygroscopic. This was collected using additional ether, and whilst still moist with ether, transferred to a drying pistol, then dried (ca. 25°/1 mm.) to give the title hydrochloride (457 mg.), M.P.>210°, $[\alpha]_D^{23}$ +33° (c. 1.00; $Me_2SO$), $\lambda_{max}$. (MeOH) 261 nm. ($E_{1\,cm}^{1\%}$ 153) and 275 nm. (inflexion, $E_{1\,cm}^{1\%}$ 91), $\nu_{max}$. (Nujol) ca. 2600 (—$NH_3$), 1800 (azetidin-2-one), 1738 (—$CO_2CH_2CCl_3$), and 1020 cm.$^{-1}$ (S→O), τ (DMSO-$d_6$) multiplets centred at 0.92 (2 protons), 1.28 (1 proton) and 1.74 (2 protons) (pyridinium o-, p- and m-protons respectively), 4.07 and 4.26 (2-proton AB-quartet, J 16 Hz.;

—$\overset{+}{CH_2N}$), 4.48 and 4.67 (two 1-proton doublets, J 5 Hz.; $C_6$—H and $C_7$—H) 4.74 and 4.92 (2-proton AB-quartet, J 12 Hz.; —$CH_2CCl_3$), ca. 4.0–5.5 broad envelope;

—$\overset{+}{NH_3}$ and $H_2O$), 5.75 and 6.04 (2-proton AB-quartet, J 18 Hz.; —$CH_2SO$).

Electrophoresis showed a single spot migrating towards the cathode, $R_c$ 4.0, which showed mauve, and the presence of some tailing, upon spraying with potassium iodoplatinate.

EXAMPLE 8 t-Butyl 7β-amino-3-bromomethylceph-3-carboxylate, 1β-oxide, hydrochloride

To a suspension of t-butyl 3-bromomethyl-7β-formamidoceph-3-em-4-carboxylate, 1β-oxide [982 mg., 2.5 mmole, prepared as described in Preparation A4 and Example B4 of copending application No. 66,128] in dry methanol-ether (1:1 20 ml.) stirred at 0–5° was added phosphorus oxychloride (0.575 ml. 6.3 mmole) at such a rate that the temperature of the mixture did not rise above 10°. The addition took place over ca. 10 min. and during the time the starting material went into solution and almost immediately a new crystalline solid was deposited. The mixture was stirred for 30 min. then refrigerated for 30 min. and the white crystalline solid collected, using ether to give the hydrochloride (880 mg. 87.7%), M.P.>200°, $[\alpha]_D^{21}$+23° (c. 1.00; $Me_2SO$), $\lambda_{max}$. (MeOH) 276.5 nm. (ε 8,680), $\nu_{max}$. (Nujol) ca. 2550 ($-\overset{+}{N}H_3$)

1796 (azetidin-2-one), 1712 ($CO_2CH_2CCl_3$), and 1005 cm.$^{-1}$ (S→O), τ ($Me_2SO$-$d_6$) 4.62 (1-proton doublet, J 5 Hz.; $C_7$-H), 4.85 (1-proton doublet, J 5 Hz.; $C_6$-H), 5.36 and 5.01 (2-proton AB-quartet, J 12 Hz.; —$CH_2Br$), 5.99 (2-proton singlet; —$CH_2SO$), ca. 4.0–6.0 (broad hump;

$-\overset{+}{N}H_3$ and $H_2O$) and 8.45 (9-proton singlet;

—$C(CH_3)_3$). TLC ($CH_2Cl$; $Me_2CO$ (1:1) showed a single spot, $R_f$ 0.25.

EXAMPLE 9 t-Butyl N-[7β-aminoceph-3-em-3-ylmethyl] pyridinium bromide/chloride 4-carboxylate, 1β-oxide, hydrochloride To a stirred suspension of t-butyl N-[7β-formamidoceph-3-em-3-ylmethyl] pyridinium bromide 4-carboxylate, 1β-oxide [472 mg., 1 mmole, prepared as described in Example D10 of copending application No. 66,128] in dry methanol-ether (1:1; 2.5 ml.) at 0–5° was added phosphorus oxychloride (0.23 ml., 2.5 mmole) dropwise at such a rate that the temperature of the mixture did not rise above 10°. The resulting solution was stirred at ca. 25° for 2 hr., during which time an oil was deposited. Ether (10 ml.) was then added to the mixture, causing the oil to solidify. The brown hygroscopic powder was collected and washed with additional ether, then dried to give the title hydrochloride (349 mg.), M.P.>200°; $[\alpha]_D^{21}$−6° (c. 1.01; $Me_2SO$). $\lambda_{max}$. (MeOH) 259 nm.

($E_{1cm}^{1\%}$ 192), 275 nm. (inflexion, $E_{1cm}^{1\%}$ 117), $\nu_{max}$.(Nujol) ca. 2600 ($-\overset{+}{N}H_3$) 1800 (azetidin-2-one), 1720 (—CH$_2$C(CH$_3$)$_3$), and 1030 cm.$^{-1}$ (S→O), $\gamma$ (Me$_2$SO–d$_6$) multiplets centred at 0.94 (2 protons), 1.30 (1 proton) and 1.73 (2 protons) (pyridinium o, p, and m-protons respectively), 4.40 (broad singlet;

—CH$_2\overset{+}{N}$), 4.61 and 4.82 (two 1-proton doublets, J 5 Hz.; C$_6$-H and C$_7$-H), ca. 4.0 to 5.5 (broad envelope; —$\overset{+}{N}H_3$ and H$_2$O 5.98 (2-proton singlet; —CH$_2$SO), and 8.49 (9-proton singlet; —C(CH$_3$)$_3$); there were also resonances centred at 6.60 and 8.88τ attributed to the presence of ether (0.5 mole equiv.). Electrophoresis showed a spot migrating towards the cathode, R$_c$ 4.3, which gave a mauve colour upon spraying with potassium iodoplatinate; some streaking of the spot became evident upon spraying.

EXAMPLE 10

2,2,2-trichloroethyl 7β-amino-3-bromomethylceph-3-em-4-carboxylate, 1β-oxide, hydrobromide A suspension of 2,2,2-trichloroethyl 3-bromomethyl-7β-formamidoceph-3-em-4-carboxylate, 1β-oxide (1.17 g. 2.5 mmole) in dry methanol (10 ml.) and ether (10 ml.) was sitrred and cooled in an ice-bath and phosphorus tribromide (1.18 ml. 10 mmole) was added over 20 minutes so that the temperature was kept below 10°. The starting material had gone into solution by the end of the addition; after a further 10 minutes a solid came out of solution. The mixture was stirred for 15 minutes, diluted with ether and refrigerated. The solid was collected and washed well with ether to give the title hydrobromide (1.24 g., 95%), M.P.>200°, [α]$_D^{22}$ —21.6° (c. 0.97; Me$_2$SO), λ$_{max}$. (MeOH) 283 nm. (ε 8,200), ν$_{max}$. (Nujol) ca. 2600 (NH$_3$+), 1790 (azetidin-2-one), 1730 (CO$_2$R) and 993 cm.$^{-1}$ (S→O), (Me$_2$SO–d$_6$) 3.7 to 6.4 (broad signal; NH$_3$+), 4.54 (1H, d, J 5 Hz.; C$_7$—H), 4.72, 4.90 (2 H, AB-q, J 12 Hz.; CH$_2$CCl$_3$), 4.76 (1 H, d, J 5 Hz.; C$_6$—H), 5.40 (2 H, s; C$_3$—CH$_2$Br), 5.86 (2 H, s; C$_2$–H$_2$) (Found: C, 22.6, 22.7; H, 2.3, 2.3; N, 5.15, 5.1; S, 6.2; total halogen 4.47 equiv./mole. C$_{10}$H$_{11}$Br$_2$Cl$_3$N$_2$O$_4$S (521.5) requires C, 23.1; H, 2.1; N, 5.4; S, 6.15%; total halogen 5 equiv./mole).

EXAMPLE 11 t-Butyl 7β-amino-3-bromomethylceph-3-em-4-carboxylate, 1β-oxide, hydrobromide

A suspension of t-butyl 3-bromomethyl-7β-formamidoceph-3-em-4-carboxylate, 1β-oxide (9.15 g., 23.25 mmole) in dry methanol (58 ml.) and ether (58 ml.) was stirred and cooled to 0 to 5° and phosphorus tribromide (6.55 ml. 58 mmole) was added over 20 minutes so that the temperature did not rise above 10°. Solid began to separate from the reaction mixture before all the starting material had gone into solution. The mixture was stirred for 30 minutes, and the solid was collected, washed by stirring with ether (150 ml.), refiltered and dried to give the title hydrobromide (9.67 g., 93%), M.P.>200° [α]$_D^{25}$—6.7° (c. 0.9; Me$_2$SO), λ$_{max}$. (EtOH) 276 nm. (ε 8,875).

I claim:
1. A process for the N-deformylation of a compound of the formula

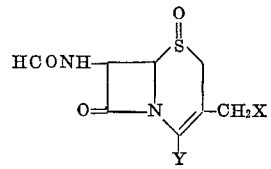

wherein X is a chlorine, bromine or iodine atom and Y is carboxy or blocked carboxy, comprising contacting said compound under substantially anhydrous conditions with an alcohol selected from the group consisting of an alkanol of 1–6 carbon atoms and an alkane diol of 2–6 carbon atoms in the presence of a Lewis acid selected from the group consisting of phosphorus oxychloride, thionyl chloride, phosphorus trichloride, silicon tetrachloride, trichlorosilane, anhydrous HCl, anhydrous HBr, phosgene, acetyl chloride, acetyl bromide, p-toluene sulphonyl chloride, dimethylsilyldichloride and trimethylsilylchloride.

2. A process as defined in claim 1 wherein said Lewis acid is selected from the group consisting of phosphorus oxychloride, thionyl chloride, anhydrous HCl and anhydrous HBr.

3. A process as defined in claim 1 wherein said Lewis acid is used in amounts of at least one equivalent based on the said compound.

4. A process as defined in claim 1 wherein said alcohol is methanol.

5. A process as defined in claim 1 wherein said alcohol contains less than 0.5% by weight of water.

6. A process as defined in claim 1 carried out in a diluent selected from the group consisting of tetrahydrofuran, diethyl ether and methylene chloride.

7. A process as defined in claim 1 carried out at from —40° to +100° C.

8. A process as defined in claim 1 wherein the resulting 7β-amino compound is isolated as an insoluble hydrobromide, a hydrochloride or a hydrogen p-toluene sulphonate.

References Cited

FOREIGN PATENTS 6,916,634  5/1970  Netherlands _____ 260—243 C

NICHOLAS S. RIZZO, Primary Examiner